United States Patent
White

[15] 3,672,163
[45] June 27, 1972

[54] INTEGRAL FUEL CONTROL

[72] Inventor: Albert H. White, Wethersfield, Conn.

[73] Assignee: Chandler Evans Inc., West Hartford, Conn.

[22] Filed: Jan. 2, 1970

[21] Appl. No.: 230

[52] U.S. Cl. ...................................................60/39.28 R
[51] Int. Cl. .............................................F02c 9/08
[58] Field of Search...............................................60/39.28

[56] References Cited

UNITED STATES PATENTS

| | | | |
|---|---|---|---|
| 3,139,894 | 7/1964 | Strebinger | 60/39.28 |
| 3,180,426 | 4/1965 | Crim | 60/39.28 X |
| 3,129,643 | 4/1964 | Porter | 60/39.16 X |
| 3,348,375 | 10/1967 | Gardner | 60/39.28 |
| 3,393,691 | 7/1968 | Longstreet | 60/39.28 X |
| 3,469,395 | 9/1969 | Spitsbergen | 60/39.28 |
| 3,487,482 | 1/1970 | Maljanian | 60/39.25 X |
| 3,521,446 | 7/1970 | Maljanian | 60/39.28 X |
| 3,596,466 | 8/1971 | Anschutz | 60/39.28 |
| 3,623,403 | 11/1971 | Smith | 60/39.28 |
| 3,187,505 | 6/1965 | Plummer | 60/39.28 |
| 3,295,315 | 1/1967 | Urban | 60/243 X |
| 3,225,814 | 12/1965 | Capwell | 60/243 |

*Primary Examiner*—Mark M. Newman
*Attorney*—Radford W. Luther

[57] ABSTRACT

A fuel control of the 3D cam type for a gas turbine engine has a proportional governor and an integral governor interconnected by a linkage which acts as a highest wins device between an acceleration schedule and the governors. The linkage also compares the actual engine speed with the desired set engine speed to position a pilot valve which controls the position of a fuel metering valve. An axially movable 3D cam has the acceleration schedule contoured on its surface and is adapted to be contacted by a follower which is functionally connected to the pilot valve. Another contour on the cam is engaged by a follower which controls the position of a compressor interstage bleed valve. A compressor air inlet temperature sensor rotatably positions the 3D cam in accordance with the magnitude of the sensed air temperature. The metering valve moves towards its full open position as the acceleration schedule on the advancing 3D cam closes the pilot valve. The proportional governor becomes effectual as the set speed is attained and the integral governor resets the proportional governor for isochronous governing at the preselected isochronous speed.

3 Claims, 6 Drawing Figures

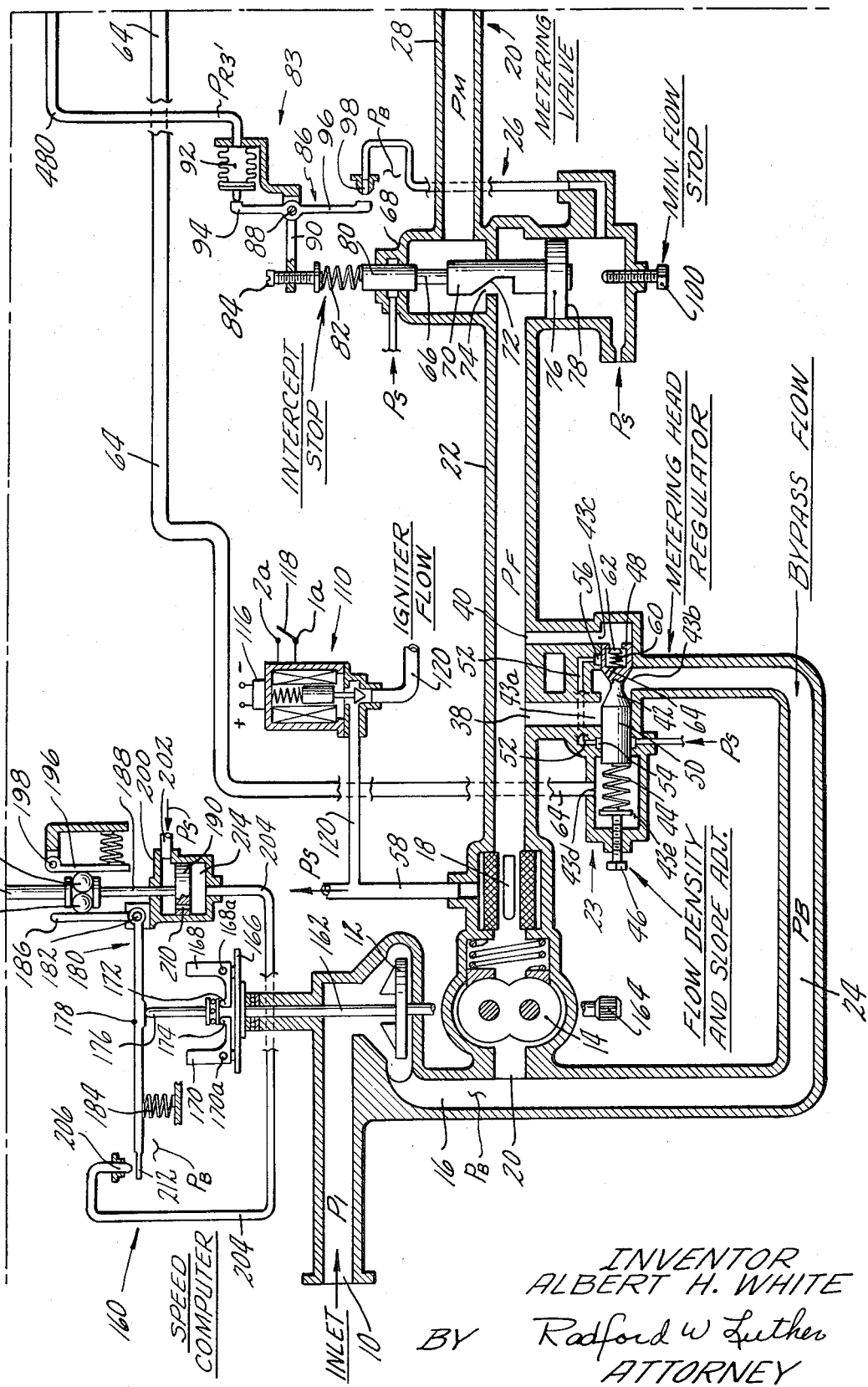

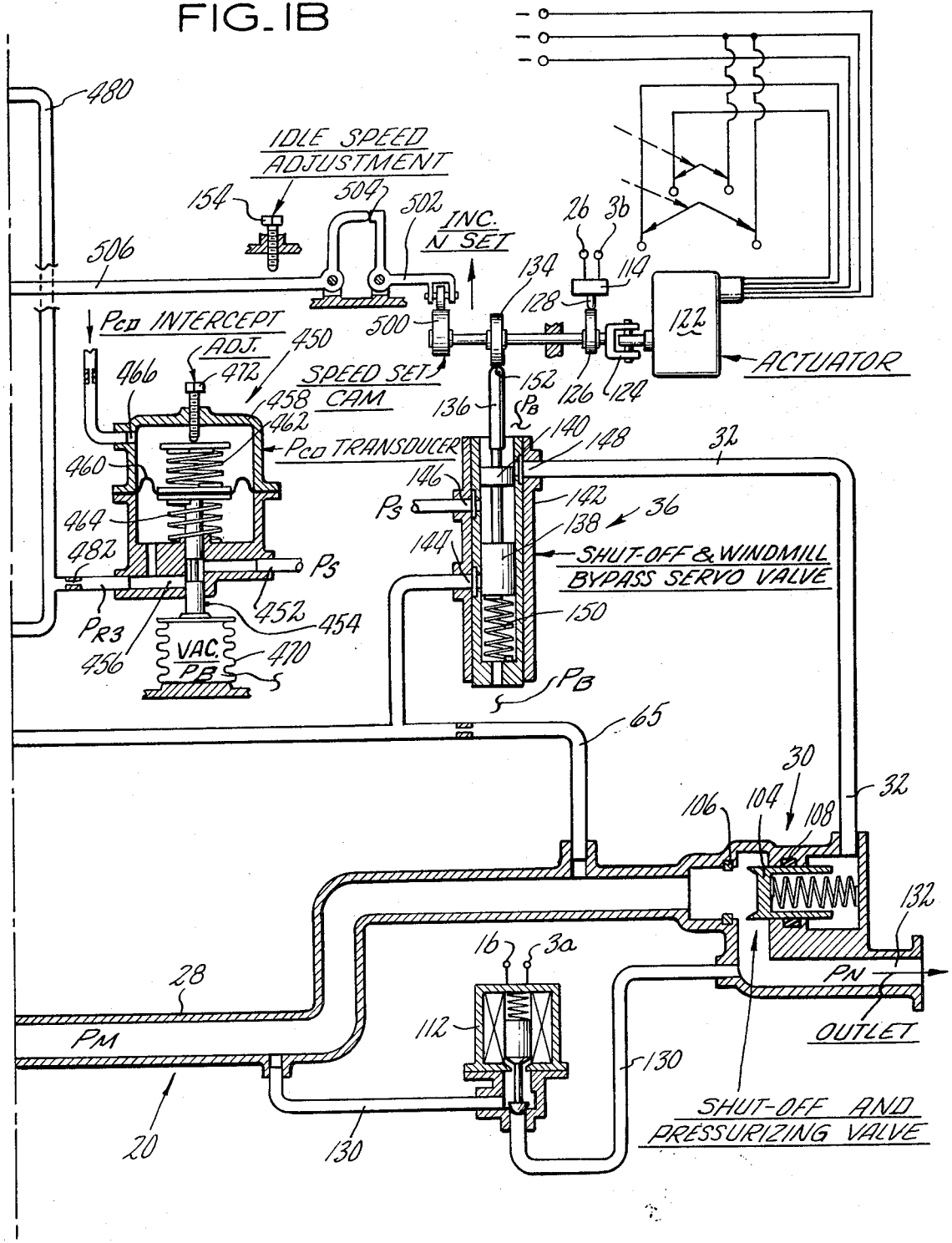

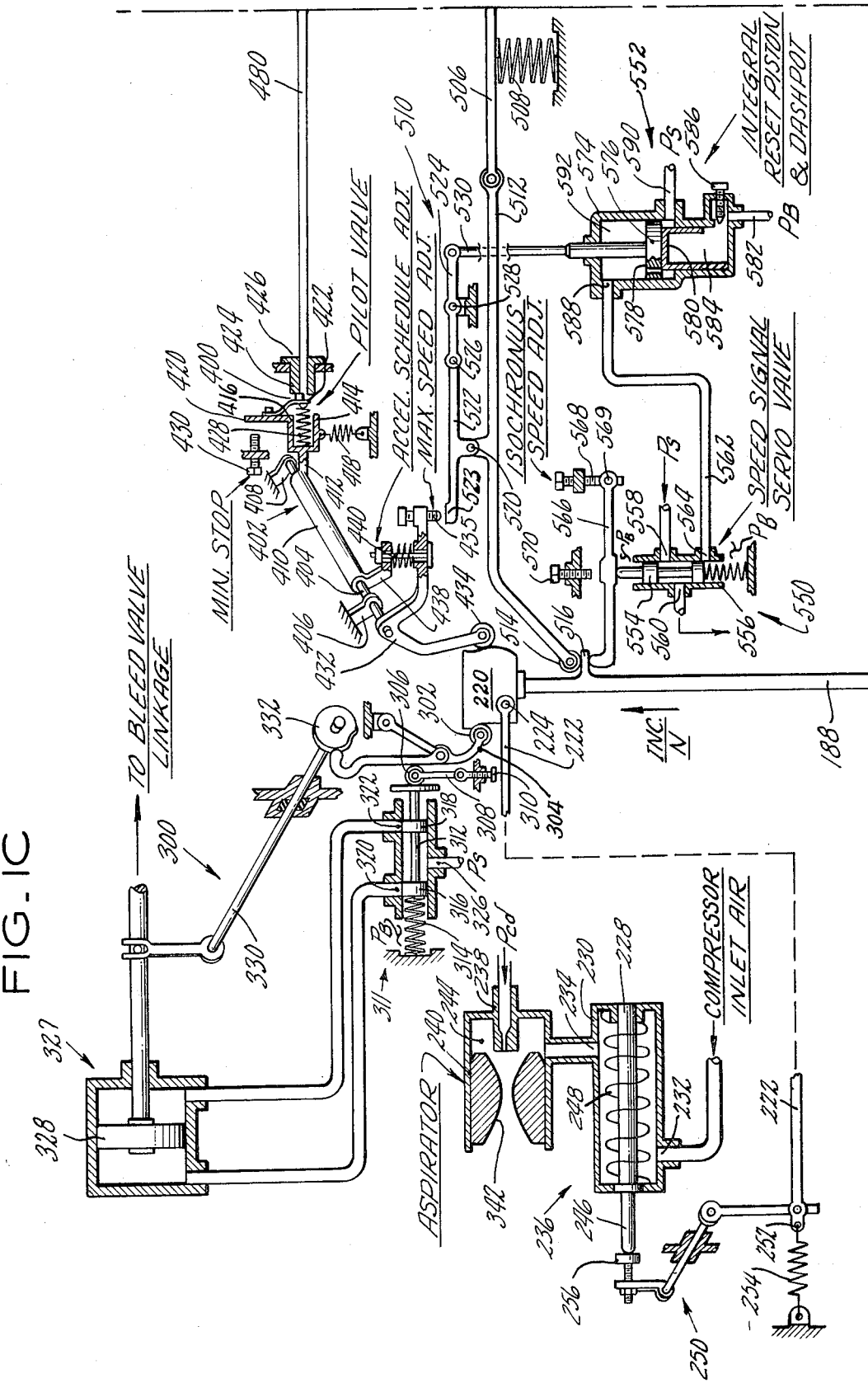

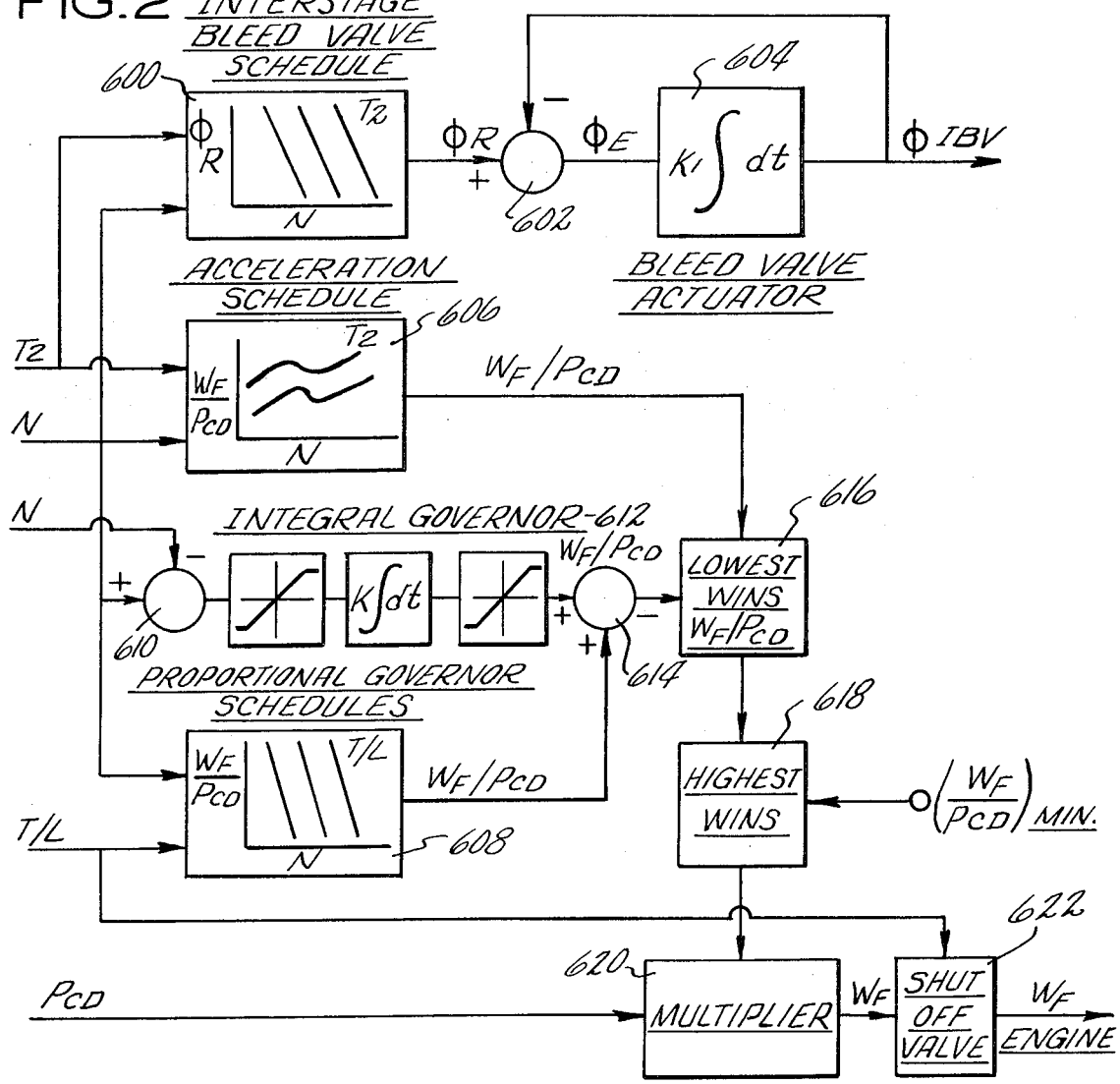
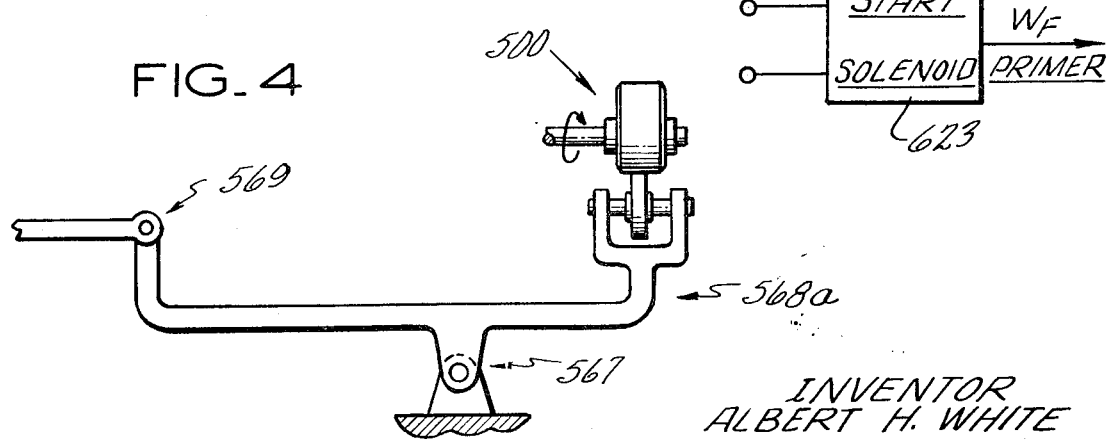

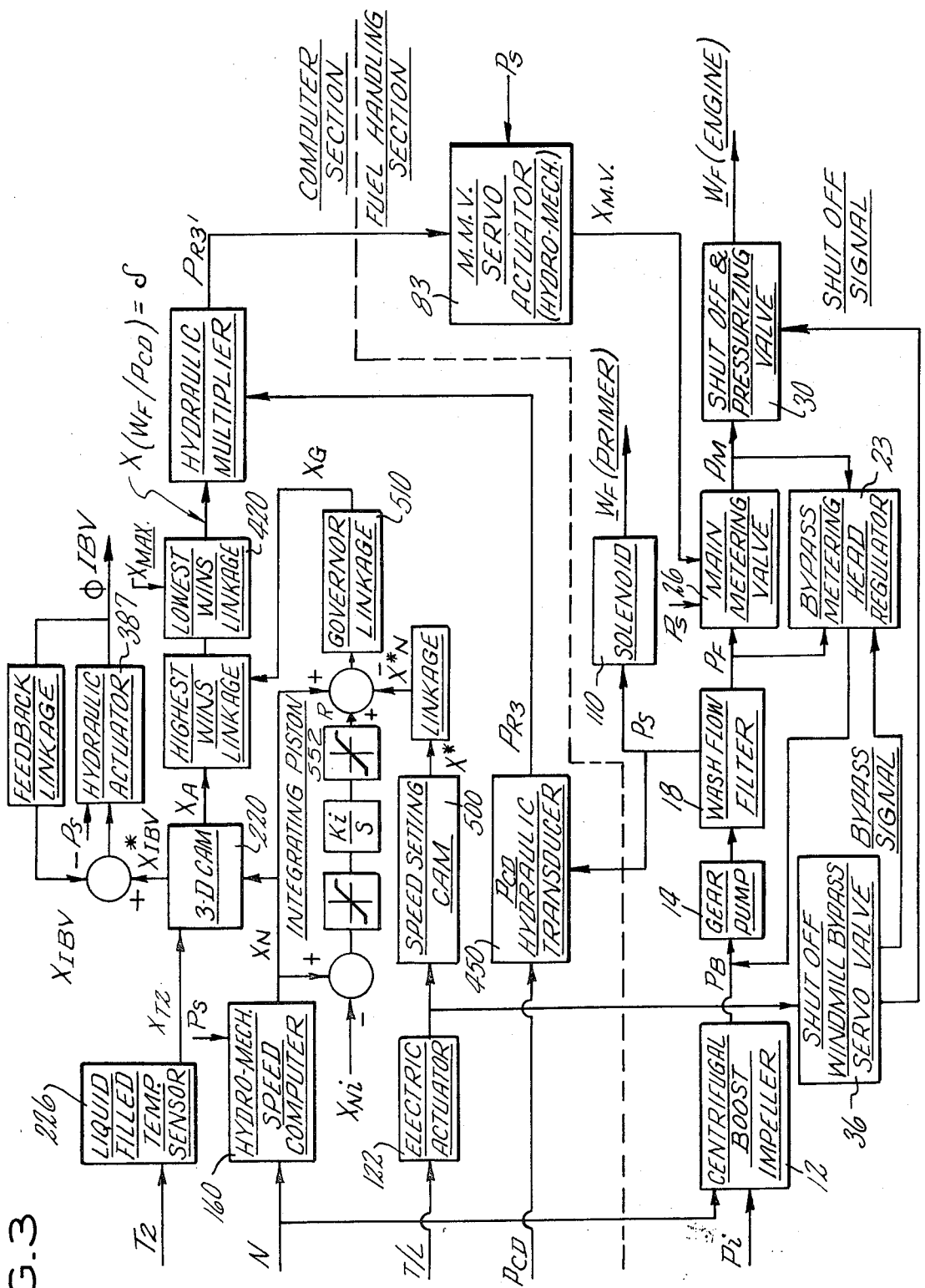

3,672,163

INTEGRAL FUEL CONTROL

BACKGROUND OF THE INVENTION

This invention pertains to fuel controls for gas turbine engines. More particularly, this invention pertains to fuel control systems which utilize combined proportional and integral governing modes for isochronous operation. This invention also pertains to fuel control systems which include a metering head regulator.

In former control systems which incorporate both proportional and integral governing features, the integral governing means is effective over the entire range of operation and responsive to large transient speed errors, such as would be encountered during changes in throttle setting. An inherent deficiency in these prior systems is that a relatively low gain integral governor must be employed, as it must function over the entire range of control operation. Because of the use of a low gain integrator, these systems have suffered from a sluggish response to commanded engine speed changes.

While previous proportional and integral control systems are capable of maintaining fine speed control (within one-fourth of 1 percent error), they have necessitated the inclusion of relatively complex arrangements and, therefore, are less reliable than pure proportional control systems. Also, the design of the low gain integrator does not readily lend itself to facile solutions, but instead often requires various refinements and sophistications.

SUMMARY OF THE INVENTION

In all control systems it is highly desirable to minimize the steady-state error. To effect a minimum steady-state error, an infinite open loop steady-state gain is required. To achieve this minimum error, some form of integral control is essential.

The invention uses a high gain integral control mode in combination with a proportional control mode to obtain a rapid response to transients and allow for fine speed control within a narrow range. The instant invention provides a proportional governor and an integrator arranged such that the integrator has limited authority above a predetermined reset magnitude to allow for only proportional governing of large transients. By limiting the authority of the integrator to just above the maximum steady-state error of the proportional control loop, the gain thereof can be increased by an amount equal to (100%/%authority), which for a gas turbine speed control would be of the order of 15/1. Therefore, the proportional governor insures a rapid transient response while the integrator furnishes an infinite (ideal integrator) steady-state gain.

Briefly stated, in a preferred embodiment a speed error signal is transmitted to an integral governor after a predetermined engine speed is attained. Prior to the time that the engine reaches this speed, governing is accomplished by a proportional governor only, and thereafter by both the proportional governor and integral governor. The integral governor in effect resets the proportional governor. A speed computer is operatively associated with a proportional and integral governing linkage. The integral governor comprises a piston and dashpot arrangement which is actuable upon receipt of a hydraulic signal from a speed signal servo valve, the position of the servo valve being controlled by the speed computer. The servo valve is adjusted so that the integral governor commences to reset the proportional governor at a desired operating speed by varying the position of the proportional governing linkage to control a pilot valve. The pilot valve in turn controls the position of a main fuel metering valve which regulates the flow of fuel to the engine. Basically, the proportional governor compares a set speed with the actual speed as sensed by the speed computer while the integrator compares the set isochronous speed with the actual speed.

Accordingly, one object of this invention is to provide a governor for a fuel control system which is capable of accurate isochronous governing and responding rapidly to transients.

Another object of this invention is to provide a fuel control system with an integral governor and a proportional governor in which the integral governor has a limited authority to reset the proportional governor.

Yet another object of this invention is to provide a fuel control system with a proportional governor and an integral governor, in which the integral governor has a relatively high gain.

These and other objects and advantages will become apparent from the following detailed description taken in connection with the accompanying drawings.

BRIEF DESCRIPTION OF THE DRAWINGS

FIGS. 1A, 1B, and 1C are respectively schematic views of different portions of a fuel control system in accordance with the invention.

FIG. 2 is a conceptual block diagram illustrating the operation of the fuel control system of FIGS. 1A, 1B, and 1C.

FIG. 3 is a functional block diagram of the control system of FIGS. 1A, 1B, and 1C.

FIG. 4 is an alternative form of the isochronous speed adjustment of FIG. 1C.

DETAILED DESCRIPTION OF THE PREFERRED EMBODIMENTS

The following symbols shown in the drawings and used in the specification have the indicated meanings:

| Symbol | Meaning |
| --- | --- |
| N | engine speed as sensed by the control |
| $N_i$ | isochronous speed as set on integral governor |
| $N^*$ | governor cut in speed |
| $N_{100}$ | 100% engine speed |
| $W_f$ | engine fuel flow |
| $W_{fi}$ | ignitor fuel flow |
| $W_{fm}$ | multiplier fuel flow |
| $T_o$ | standard sea level temperature (59°F) |
| $T_2$ | compressor total inlet temperature |
| $\phi$ | $T_2/T_o$ (°R/°R) |
| Pcd | compressor discharge pressure |
| $P_{CD}$ | control sensed compressor discharge pressure |
| $P_I$ | pump inlet fuel pressure |
| $P_B$ | boost pressure (output of centrifugal impeller) |
| $P_S$ | servo supply pressure |
| $P_F$ | control inlet pressure |
| $P_M$ | metered flow pressure |
| $P_N$ | engine main nozzle pressure |
| $P_I$ | engine igniter nozzle pressure |
| $P_{R3}$ | hydraulically transduced compressor discharge pressure |
| $P_{R3}$ | modulated $P_{R3}$ |
| $X_{T2}$ | $T_2$ sensor stroke |
| $X_{IBV}$ | IBV actuator servo valve position |
| $X^*IBV$ | set IBV servo valve position |
| $X_A$ | output of acceleration $W_f/P_{cd}$ contour, i.e., pilot valve opening |
| $X_N$ | speed computer stroke |
| $X_N^*$ | speed computer stroke at governor cut in |
| T/L | throttle lever position |
| $X^*$ | throttle cam setting |
| $X_{NI}$ | speed computer stroke at N=isochronous set speed |
| R | integrating (Reset) piston stroke |
| $X_G$ | governor output, pilot valve opening |
| $X_{max}$ | maximum pilot valve opening |
| $X(W_f/P_{cd})$ | $W_f/P_{cd}$ pilot valve opening |
| $X_{MV}$ | main metering valve stroke |
| $\phi R$ | desired IBV angular position |
| $\phi$ IBV | high pressure compressor interstage bleed valve angular position |
| $\phi E$ | IBV position error |

A preferred embodiment of the invention is capable of delivering fuel to a gas turbine engine in safe and adequate proportions for starting, acceleration, isochronous governing at 100 percent engine speed, proportional governing at speeds below 100 percent, and engine deceleration. This system is also adapted to control the position of a high pressure compressor interstage bleed valve. The engine parameters which are sensed by the control are:

| | |
|---|---|
| $T_2$ | compressor total inlet temperature |
| N | engine speed |
| T/L | throttle lever position |
| $P_{cd}$ | compressor discharge pressure |
| $\phi$ IBV | bleed valve angular position |

Referring to FIG. 1A, fuel enters the fuel control through a fuel inlet 10 and passes through a centrifugal impeller pump 12 and is delivered from the centrifugal pump to a tip seal positive displacement gear pump 14 via conduit 16. Fuel from tip seal pump 14 flows through a wash flow filter 18 which is mounted within a main fuel supply line, generally designated at 20, the filter being contained in segment 22 thereof. Fuel is delivered from the wash flow filter 18 at unregulated pressure $P_s$ for use in the engine during the starting operation and as servo fluid in the control system itself.

Flow leaving the filter in an axial direction, in excess of the metered output flow, is bypassed to the pump inner stage by means of metering head regulator 23 and bypass line 24. Metering head regulator 23 maintains a constant pressure differential across metering valve 26 to thereby enable the flow through the metering valve to be determined by the metering area of the metering valve which is prescheduled such that metered flow is proportional to the position of the valve. The metering valve is positioned by a force feedback servo system such that the valve position is proportional to a hydraulically computed pressure signal $P_{R3}$ from the computer of the control, as is more fully described hereinafter.

Flow emerging from metering valve 26 passes through segment 28 of main fuel supply line 20 to a pressurizing valve 30 which serves to maintain an adequate servo supply pressure $(P_s - P_B)$. Pressurizing valve 30 is referenced to boost pressure to minimize the effect of variations in boost pressure on hydraulic computation. The pressurizing valve 30 also serves as the shut-off valve for the fuel control system. This latter function is accomplished by communicating $P_s$ through a duct 32 to the boost pressure side 34 of pressurizing valve 30 by means of a throttle actuated shut-off servo valve 36.

The detailed structure of the metering head regulator 23 will now be described. The regulator valve is positioned in the bypass line between bypass main line 24 and bypass branch line 38 and $P_f$ sensing and bypass branch line 40. The valve is of the hour-glass type construction which provides flow force compensation to thereby improve its regulation accuracy. Spool 42 is mounted in housing 43 which includes inlet and outlet ports 43a and 43b respectively, first and second pressure sensing ports 43c and 43d respectively, and chamber 43e. The spool is spring biased by spring 44. The spring preload acting on the regulator valve 23 determines the nominal value of metering head pressure $(P_f - P_M)$. Adjustment screw 46, which is in contact with spring 44, is positionable to accommodate alterations in the preload, in order to vary the metering head to thereby compensate for changes in fuel density. Adjustment screw 46 may also be utilized to change the slope of the fuel flow versus computed pressure signal $(P_{R3})$ relationship; thereby shifting the fuel schedules about their nominal position. First and second spaced lands 48 and 50 are interconnected by narrow portion 51 of spool 42 and are washed by filtered flow from wash line 52 to prohibit contaminants, which might be present in the fuel, from entering the periphery of the lands and thereby prevent the spool from binding in its housing. Lines 52 are in communication with annuli 54 and 56 which evenly distribute the flow from wash line 52 around the surface of the lands. Flow in lines 52 is derived from wash flow filter line 58 which is also, of course, the source of servo fluid for the various components of the fuel control system.

In order to guard the fuel control system against excessive pressures, the pump discharge pressure is limited to a predetermined value above case pressure by a spring loaded bypass poppet valve 60 mounted in land 50. When the pressure in branch line 40 exceeds this predetermined value, ball 62 unseats against its spring preload and fuel is vented to boost via passage 64. It should be noted that pressure relief valve 60 functions strictly as a safety device and will remain closed during normal operation. Conduit 64 fluidly interconnects the metering head regulator 23 and segment 28 of main fuel supply line 20 to transmit $P_M$ pressure to the regulator.

The main metering valve servo system 83 is a hydromechanical servomechanism which operates to position the main metering valve 26 in proportion to $P_{R3}$. Metering valve 26 includes a spool 66 slideably mounted in a housing 68. Spool segment 70 has a contoured notch 72 cut therein adapted to vary the metering area which fluidly interconnects segments 22 and 28 of main fuel supply line 20. A differential area piston 76 is secured to the end of segment 70, the lower surface 78 of the piston 76 being exposed to servo pressure $P_s$ through a restrictor. The upper segment 80 of spool 66 is biased by feedback spring 82, the preload of which is adjustable by means of set screw 84 to adjust the $W_f$ intercept, i.e., the amount of fuel flow at $P_{R3}$ equal to zero psi above boost. This adjustment is primarily for nulling out the force in the servo valve loading spring 82. Bell crank 86 is pivotably mounted at 88 for rotational movement in response to a change in the pressure $P_{R3}$. Arm 90 of bell crank 86 is threadingly secured to screw 84. Bellows assembly 92 contacts arm 94 of bell crank 86 so as to urge rotation of the bell crank about pivot 88. The outboard portion of arm 96 is disposed adjacent nozzle 98 so as to form a flapper valve arrangement. Nozzle 98 is in fluid communication with the outboard face 78 of differential area piston 76 so that impedance of the flow from nozzle 98 by the outboard portion of arm 96 tends to increase the pressure on face 78 of the differential area piston 76, thereby displacing the spool 66 in an upward direction.

The restriction to the flow emanating from nozzle 98 is therefore a function of the change in pressure $P_{R3}$ in the bellows. Assuming the main metering valve is in a steady-state position, an increase or decrease in the pressure $P_{R3}$ respectively results in an increase in pressure on face 78, or a decrease in pressure on face 78. Assuming, for example, that $P_{R3}$ increases, the egress of fluid through nozzle 98 is impeded by the outboard portion of arm 96 due to the rotational movement of the bell crank about pivot 88, thus engendering a pressure increase adjacent face 78 of the differential area piston 76. This increase in pressure adjacent face 78 causes the metering valve spool to move in an upward direction, the motion of the spool being transmitted to the bell crank via spring 82 by arm 90, which in turn increases the clearance between the outboard portion of arm 96 and nozzle 98 until the valve arrives at a new steady-state position. Contrariwise, if $P_{R3}$ decreases, a greater clearance is occasioned between nozzle 98 and arm 96 of the bell crank, thereby reducing the pressure adjacent face 78, and causing downward movement of the valve and repositioning of arm 96 in a similar manner. A minimum flow stop adjustment screw 100 is threadingly mounted at the base of housing 68 to physically prevent the valve from closing past a set position.

The shut-off and pressurizing valve 30 is formed by a spring loaded cylindrical poppet valve 104, which is urged against a rubber seat 106 when fuel is shut off to the engine. In addition to shutting off fuel flow to the engine, the valve 30 acts as a pressurizing valve to provide a minimum servo supply pressure $(P_s - P_B)$. A glyde ring 108 mounted in the periphery of the valve housing, acts to seal metered flow pressure $P_m$ from boost pressure $P_B$ in order to eliminate the problem of handling contaminated fuel through a small clearance between the valve and sleeve and thereby render a valve seizure most unlikely.

The starting circuit is comprised of an igniter solenoid 110, a windmill bypass solenoid 112, and a throttle actuated microswitch 114. A DC voltage source supplies voltage to both of the solenoids upon the closing of a switch 118. The windmill bypass solenoid 112 is not activated until the closure of microswitch 114, which has a time delay element therein. Solenoids 110 and 112 are connected in parallel to voltage source 116 such that terminals 1a and 1b of solenoids 110 and 112 respectively are at a point of common potential. Terminals 2a and 2b of solenoid 110 and microswitch 114 respectively, and terminals 3a and 3b of solenoid 112 and microswitch 114 respectively are similarly at respective points of common potential in the parallel starting circuit. When switch 118 of solenoid 110 is manually closed, a voltage is delivered to the solenoid 110 which opens a passage 120 that connects with conduit 58, thus effecting a flow through wash flow filter 18 to the engine igniter nozzle (not shown).

Throttle actuator 122 is connected to a shaft 124 which has a shut-off cam 126 mounted thereon for rotational movement with the shaft. Rotation of the cam 126 causes depression of element 128 in microswitch 114, which activates the time delay feature in the switch. After a predetermined delay, switch 114 closes, thus impressing a voltage across terminals 1b and 3a of windmill bypass solenoid 112, and thereby allowing flow through passage 130, which fluidly interconnects segment 28 of the main fuel supply line with the outlet 132 of the fuel control to bypass pressurizing valve 30. Switch 118 of igniter solenoid 110 is opened to de-energize the circuit after a sufficient engine speed has been attained. With switch 118 in the open position, flow is curtailed in the passages 120 and 130.

To recapitulate briefly, to energize the igniter windmill bypass circuit, switch 118 is closed, thus opening solenoid 110 and permitting flow in passage 120 to the engine's igniter nozzle. As the throttle setting is changed, shaft 124 rotates, thereby activating the time delay in microswitch 114, which eventually causes the windmill bypass solenoid 112 to open and permit a flow in passage 130. Switch 118 is then opened at a desired engine speed, thus closing both the igniter solenoid and the windmill bypass solenoid to block flow in passages 120 and 130 respectively. The engine then automatically accelerates to idle, as is explained hereinafter.

Referring again to FIG. 1B, shut-off and windmill bypass servo valve 36 is actuated by a cam 134 on the electric throttle actuator shaft 124. During operation of the fuel control, this valve is down (in the position as shown in the drawing), and $P_B$ is ported to the pressurizing valve via conduit 32. Simultaneously, $P_m$ pressure is ported to the metering head regulator 23 to provide for normal functioning of that component. In order to shut off fuel flow, the electric actuator off switch (not shown) is energized, at which time the cam positions the shut-off valve upwardly from its position shown in the drawing to sequentially:

a. Vent the $P_m$ side of the metering head regulator to $P_B$ to fully open the metering head regulator to bypass pump discharge to boost (During this operation, spool 42 will be shifted axially to the left);

b. Direct $P_s$ pressure behind the pressurizing valve, thereby forcing it to close and shut off fuel to the engine.

The shut-off and windmill bypass servo valve 36 is formed by an elongated spool 136, which has two lands 138 and 140 spaced thereon. The outboard faces of the lands are exposed to boost pressure $P_B$. The valve housing 142 comprises three ports 144, 146 and 148. Port 144 communicates with conduit 64, which in turn communicates with metering head regulator 23. Port 146 communicates with conduit 58 to supply pressurized servo fluid to the valve. Port 148 communicates with conduit 32, which is connected to the boost pressure side of the shut-off and pressurizing valve 30. The outboard face of land 138 is spring biased upwardly by spring 150 in order to effect firm contact between the extremity 152 of spool 136 and cam 134, as is readily apparent from FIG. 1B.

Upward displacement of spool 136 causes port 148 to fluidly communicate with port 146, thereby directing pressure $P_s$ to the boost pressure side of the shut-off and pressurizing valve 30. As land 138 moves upwardly past port 144, boost pressure is vented to the $P_m$ side of the metering head regulator valve 23 via conduit 64. Proper sequencing of the operations performed by windmill bypass and shut-off valve 36 is accomplished by staggering the porting thereof. This sequencing occurs during the last 3° of actuator rotation. Above approximately the last three degrees of rotation, the control maintains the engine at idle. This is accomplished with an externally adjustable fix stop 154, which prevents engine speed from being set below that of ground idle.

A speed computer, generally indicated at 160, in FIG. 1A is a null type force feedback servomechanism which generates a hydraulic power amplified position signal as a function of engine speed. The speed computer is driven by shaft 162, which also drives impeller 12 and tip seal gear pump 14. The lower end of shaft 162 is operatively connected to the engine gear box (not shown) at 164. The upper end of shaft 162 is connected to turn table 166 upon which fly weights 168 and 170 are pivotably mounted at 168a and 170a respectively. As the engine speed increases, flyweights 168 and 170 fly outwardly causing projections 172 and 174 respectively to upwardly displace shaft 176. Conversely, any reduction in speed causes the flyweights to move inwardly, thus lowering shaft 176. The upper end of shaft 176 is connected to arm 178 of L-shaped structure 180 which is pivoted at 182. Arm 178 is biased by spring 184, while the other arm 186, of the L-shaped structure 180, bears against a nutcracker arrangement.

The shaft 188 of piston 190 comprises two laterally movable steel balls 192 and 194, the arm 186 being in contact with ball 192. The other ball 194 bears against a spring loaded lever 196 pivoted at 198. Piston 190 which is slideably mounted for axial movement in a housing 200, has an upper portion which communicates with pressurized servo fluid from the wash flow filter 18 by means of conduit 202. The lower part of the housing 200 is in communication with a conduit 204, which supplies nozzle 206 mounted on the end thereof. Flow then proceeds from conduit 202 through bleed hole 210 in piston 190, and thence through conduit 204 to emerge at nozzle 206. The extremity 212 of arm 178 inhibits the egress of fluid from nozzle 206. As extremity 212 approaches the mouth of nozzle 206, the pressure in chamber 214, adjacent the lower face of piston 190, increases, thus displacing shaft 188 in an upward direction. As the distance between extremity 212 and nozzle 206 increases, the pressure in chamber 214 decreases, thus permitting downward movement of piston 190.

In the case of an increase in engine speed, flyweights 168 and 170 fly outwardly raising shaft 176 and rotating arm 178 in a clockwise fashion. As a corresponding clockwise movement is imparted to arm 186 of L-shaped structure 180, a lateral rightward translation of balls 192 and 194 is effected against the urging of lever 196. The pressure in chamber 214 then increases due to the reduced clearance between nozzle 206 and extremity 212, causing a force imbalance on piston 190, which imparts an upward motion to shaft 188. As shaft 188 translates upwardly, balls 192 and 194 translate in a leftward lateral direction due to the urging of lever 196, thus moving the L-shaped structure in a counterclockwise fashion to restore the original clearance between extremity 212 and nozzle 206. In like manner, when piston 190 reaches a new steady-state position, should the engine speed decrease, flyweights 168 and 170 will move inwardly, thus causing arm 178 to move downwardly by means of the urging of lever 196, as transmitted by the lateral translation of balls 194 and 192 to arm 186. Shaft 188 will then move downwardly due to a decrease in pressure within chamber 214, occasioned by the increased clearance between extremity 212 and nozzle 206. As the shaft 188 moves downwardly, arm 178 rotates in a clockwise fashion under the urging of spring 184, thus causing the arm 186 to push against ball 192 in such a manner as to cause lateral translation of balls 192 and 194 in a rightward sense against the urging of lever 196. The clearance between extremity 212 and nozzle 206 is restored to its null position when piston 190 has reached a new steady-state position.

To summarize, when the engine speed changes, the flapper valve arrangement, defined by nozzle 206 and extremity 212, effects a control pressure change which forces the power piston 190 to stroke in a direction which restores the flapper valve arrangement to its null position.

At the upper end of shaft 188, a 3D cam 220 is pivoted for rotational movement thereabout and translative movement therewith. Cam 220 is rotated about the axis of shaft 188 by rod 222 which is pivoted on the periphery of the cam at 224.

Movement of rod 222 is controlled by a compressor inlet temperature sensor, generally designated at 236. A temperature probe 228 is mounted within housing 230. Air at the compressor inlet of the engine is directed into housing 230 and emerges at outlet 234. Aspirator 240, which communicates with outlet 234, induces a differential pressure between the inlet and the outlet of the probe housing 230 to produce a flow therethrough. This is accomplished by venting air from the compressor discharge section through channel 238 into aspirator 240. Aspirator 240 has a venturi 342 positioned therein to create a low pressure in chamber 244 of aspirator 240, the chamber being in fluid communication with outlet 234. The temperature probe is formed by a tube and rod 246, the volume therebetween being filled with a cellesol fluid. The fluid is sealed by the lapped rod 246, which is free to move according to the change in fluid volume as determined by the compressor inlet temperature $T_2$. The tube is provided with a helical fin 248 to improve the circulation of compressor inlet air thereabout, and thus improve the rate of heat transfer therethrough. The output stroke of lapped rod 246 is transmitted to rod 222 through a series of linkages 250. The terminus of rod 222 comprises an eyelet 252, which is connected to a loading spring 254 to establish firm contact between rod 246 and linkage member 256. As can be understood from the foregoing, cam 220 is translated as a function of engine speed (N) and rotated as a function of engine compressor inlet temperature.

The instant fuel control system is adapted to be utilized with a turbine engine which includes a compressor interstage bleed valve by virtue of a compressor interstage bleed valve actuator, generally indicated at 300. The left surface of cam 220 is contoured to provide a bleed valve position schedule as a function of rotor speed and engine inlet temperatures, hereinafter referred to as the corrected speed (N/$\sqrt{\theta}$). The heretofore mentioned left surface of cam 220 abuts a follower 302 which is rotatably mounted at the lower end of link 304. An intermediate portion of link 304 contacts a follower 306 which is mounted on the upper portion of a slope adjustment shaft 308. Shaft 308 is adjustable by means of a set screw 310 to vary the linkage ratio in such a manner as to change the steady-state gain $$\frac{\Delta \phi}{\Delta N/\sqrt{\theta}}$$

Follower 306 contacts a spool 312 which is urged against the follower by spring 314. Spool 312 includes lands 316 and 318 which are positioned adjacent ports 320 and 322 respectively, the ports being formed in housing 324. Inlet port 326 delivers pressurized servo fluid to the annulus defined between the two lands. The cavities defined by the outboard portions of lands 316 and 318 and housing 324 are at boost pressure $P_B$. Outlet ports 320 and 322 communicate with the sides of an approximately equal area piston 328 which is operatively connected to a feedback linkage 330. Linkage 330 includes a rotatable shaft with a feedback cam 332 mounted thereon for rotational movement therewith. The upper extremity of link 304 is in contact with feedback cam 332 to follow the movements thereof.

Upward motion or rotation to the right of cam 220 causes link 304 to pivot about the point of contact between its upper extremity and cam 332, thus causing spool 312 to shift to the right and thereby venting the fluid on the left-hand side of the piston 328 to boost while placing the righthand side of piston 328 in fluid communication with the pressurized servo fluid.

Consequently, this motion or rotation produces a leftward displacement of piston 328. As piston 328 moves leftward, feedback linkage 330 rotates cam 332 in a counterclockwise manner causing link 304 to pivot about the point of contact between the 3D cam 220 and follower 302 in a counterclockwise manner, thereby displacing spool 312 to the left. When piston 328 has assumed a new steady-state position to the left of that shown in the drawing, lands 316 and 318 on valve spool 312 cover ports 320 and 322 respectively. After a sufficient corrected speed has been attained, piston 328 is at its leftward limit of travel and the interstage bleed valve is fully closed.

Conversely, a reduction in corrected speed from the speed at which the interstage bleed valve attains full closure causes piston 328 to shift to the right in accordance with the magnitude of the speed reduction. After a sufficient corrected speed reduction from the speed at which the interstage bleed valve attains its fully closed position, piston 328 is positioned at its rightward limit of travel, thus causing the bleed valve to fully open. The corrected speed range during which the bleed valve is in an intermediate position is, of course, dictated by the contour of the cam upon which follower 302 rides. For certain prior art engines, this speed range will not exceed ten percent.

The right face of the 3D cam 220 comprises an acceleration contour, which is of course, separate and distinct from the contour on the left face of the cam. The acceleration contour serves to position the $W_f/P_{cd}$ pilot valve to provide the specified acceleration fuel flow schedules. In order to determine the contour of the acceleration schedule on the cam 220, it is necessary to obtain $W_f/P_{cd}$ from the acceleration fuel flow and compressor pressure ratio schedules for the particular engine sought to be controlled. The acceleration schedule on the cam determines the amount of opening X ($W_f/P_{cd}$) of pilot valve 400, and therefore for each value of $W_f/P_{cd}$ the corresponding pilot valve position must be determined. Since $W_f/P_{cd}$ is a function of speed and temperature, the corresponding pilot valve position is also dependent upon speed and temperature.

A positionable pilot valve control assembly, generally indicated at 402, controls the opening of the pilot valve. This assembly and the servomechanism 83 form a control device to position the metering valve. The pilot valve assembly 402 includes a shaft 404 fixedly secured to brackets 406 and 408. A concentric sleeve 410 is rotatably mounted on shaft 404 for movement thereabout. Sleeve 410 has a radial projection 412 which bifurcates into segments 414 and 416. Projection 412 is restrained from upward movement by tension spring 418 connected to segment 414. Segment 416 has a vertical extension 420, to which is secured a leaf spring 422. Leaf spring 422 abuts the upper side 424 of nozzle 426 so as to form an opening at the mouth thereof. Leaf spring 422 is also urged against the mouth of nozzle 426 by compression spring 428. Set screw 430 dictates the minimum value of $W_f/P_{cd}$ by limiting the counterclockwise travel of vertical extension 420. At the end of shaft 404 near bracket 406 is pivoted link 432 to which, at one end thereof, is mounted a follower 434, which follows the acceleration schedule contour on the right face of cam 220. The other end of link 432 has a maximum speed adjustment screw 435 passing therethrough which is associated with the governor of the invention as is subsequently explained. The left end of shaft 410 has an integral projection 438 which is secured to link 432 by a collapsing mechanism comprised of spring biased nut and bolt assembly 440. This assembly is utilized to adjust the acceleration schedule.

A compressor discharge pressure transducer, generally indicated at 450, throttles incoming servo supply fluid which is at a pressure $P_s$ to maintain a hydraulic pressure $P_{R3}$ approximately equal to $P_{cd}$ plus control case pressure ($P_B$). Inlet port 452 of transducer 450 receives servo fluid from conduit 58. After traversing spool 454, the servo fluid emerges in passage 456 at a pressure $P_{R3}$. Mounted within housing 458 of the transducer 450 is a $P_{R3}$ and $P_{cd}$ sensing diaphragm 460 which is spring loaded by upper spring 462 and lower spring 464. A compressor discharge pressure inlet 466 communicates with the upper surface of the diaphragm 460, while the lower surface of the diaphragm communicates with passage 456 via duct 468. The upper surface of the diaphragm is then exposed to pressure $P_{cd}$ and the lower surface is exposed to pressure $P_{R3}$. The upper end of valve spool 454 is fixedly attached to diaphragm 460, while the lower end of the spool 454 is secured to an evacuated bellows 470 which is exposed to case pressure $P_B$.

For a loading spring preload which is nominally equal to zero, it can be shown that the steady-state force balance of the system can be expressed by the relationship $P_{R3} - P_B = K_{1P_{cd}} - K_2 X$, wherein $K_1$ and $K_2$ are constants, and X is the valve stroke. Thus, since the above relationship shows that the transducer pressure is a function of valve stroke, a problem arises in that $P_{R3} - P_B$ is not maintained constant for a fixed value of $P_{cd}$. It is therefore necessary that the design constant incorporated in the transducer 450 be selected to minimize the droop relationship between $P_{R3} - P_B$ and X. A $P_{cd}$ intercept adjustment set screw 472 varies the preload in the loading spring to alter the transduced pressure. This adjustment is used to null out a possible built-in preload in the bellows and thereby approach a one to one relationship between $P_{cd}$ and $P_{R3} - P_B$.

Conduit 480, which interconnects nozzle 426 of pilot valve 400 and bellows 92 of metering valve 26, is supplied with fluid from passage 456 through a fixed bleed 482, the pressure $P_{R3}$, in conduit 480 being determined by the pressure $P_{R3}$ and the position of pilot valve 400. A hydraulic multiplier is then formed by the $W_f/P_{cd}$ actuated pilot valve 400 in series with the fixed bleed 482 located downstream of the $P_{cd}$ transducer 450. The diameters of the bleed 482 and pilot valve 400 should be selected to provide a pressure signal which is representative of engine fuel flow throughout the specified operational envelope and to ensure the desired engine fuel flow accuracy in both the acceleration and governing modes of operation. It is therefore the function of the hydraulic multiplier to produce a pressure $P_{R3}$, which is proportional to the fuel flow computed by the control.

The extreme end portion of throttle actuator shaft 124 comprises a speed set cam 500. The speed setting cam 500 generates a second set speed signal which is representative of the desired engine operating speed as set by electric actuator 122. This signal actually sets the governor cut-in point, i.e., the speed at which the proportional governor overrides the acceleration schedule and decreases fuel flow along the droop curve to the steady-state operating point. Obviously, to determine the cut-in speed required to yield a specific steady-state engine speed, it is necessary to consult the fuel flow and compressor ratio schedules for the engine which is to be associated with the control. However, it is highly desirable that the rotary actuator 122 be capable of adjustment at each speed setting so that the steady-state operating speed may be set within the desired speed accuracy.

A pivoted bell crank type of follower linkage 502 is responsive to the rotation of the speed set cam 500. An abutment 504 on an arm of the follower linkage 502 contacts a pivoted link 506 which is biased by a compression spring 508. A proportional governor generally indicated at 510 is pivoted to link 506 at the end of main link 512 of the proportional governor linkage. Therefore, counterclockwise rotation of link 506 about its pivot results in a downward displacement of the main governor link 512. This downward displacement will, of course, be due to an increase in the set speed by the cam 500.

The other end of main governor link 512 senses an actual speed signal. Link 512 has a follower 514 mounted thereon which rests on a lateral projecting surface 516 of shaft 188, and therefore, moves up and down with shaft 188 in accordance with changes in engine speed. Links 512, 506, and 502 compare the second set speed signal generated by the speed set cam 500 and an actual speed signal generated by the speed computer surface 516 and generate a resultant signal at 520.

Pivotally mounted on the intermediate portion of main link 512 at 520 is link 522, which forms, along with link 524, a reset linkage assembly. This assembly essentially functions as a multiplier. Links 522 and 524 are pivotally interconnected at 526, link 524 being fixedly pivoted at 528. The right end of link 524 is pivoted to output shaft 530 of an integral governor generally indicated at 532. Links 522 and 524 serve to limit the maximum corrective signal and hence authority or reset capability of the integral governor.

A speed signal servo valve device 550 and an integral reset piston and dashpot 552 form the heart of the integral governor. Speed signal servo valve device 550 includes a lapped spool valve 554 slideably mounted within housing 556. Housing 556 has an inlet port 558 in communication with pressurized servo fluid and outlet port 560 which directs flow to the bearing of pump 14. The lower land on spool 554 serves to control the flow in interconnecting line 562, which fluidly interconnects port 564 of housing 556 and the integral reset piston and dashpot 552. The spring biased upward movement of spool 554 permits port 564 to communicate with boost pressure. The upper portion of spool 554 is in contact with a lever 566, one end of which is pivotably connected to an isochronous speed adjustment screw 568 at pivot 569, and the other end of which is in abutting relationship with the lower surface of lateral projection 516. The screw 568 transmits a first set speed signal to lever 566 and the lateral projection transmits an actual speed signal to lever 566. An externally adjustable screw 570 fixedly mounted above lever 566 serves to prevent the speed signal servo valve from exceeding a preselected stroke by acting as a physical stop on lever 566. This adjustment limits the maximum speed error signal input to the integral reset piston and dashpot. Thus, a clockwise rotation of screw 570 tends to decrease the maximum speed error signal input. The isochronous speed adjustment screw 568 is employed to select the speed at which isochronous governing will commence. Port 564 opens as this speed is attained. The function of the speed signal servo valve 550 is then to:

A. actuate the integral reset piston by transmitting a speed error signal; and
B. control pump bearing flow.

Screw 568 may be replaced by a link, generally indicated at 568a in FIG. 4 and pivoted at 567, which connects pivot 569 with speed set cam 500 in order to allow for isochronous governing at the speed set by the throttle actuator 122.

The integral reset piston and dashpot 552 includes a housing 574 in which is slideably disposed a piston 576 having a bleed hole 578 passing therethrough The upper surface of piston 576 is connected to output member 530, while the lower surface is integral with cup-shaped member 580, which is similarly slideably mounted in housing 574. Port 582 is in communication with boost pressure and chamber 584. A needle valve 586 serves to restrict flow from port 582 to chamber 584 and causes the arrangement to act as a dashpot when member 580 is displaced. The upper surface of piston 576 is in fluid communication with outlet port 588, which in turn communicates with port 564 of the speed signal servo valve 550 by means of interconnecting line 562. Inlet port 590 communicates with the outer peripheral lower surface of piston 576, which is defined by the lower surface of 576 and cup-like member 580. Fluid from port 590 passes through the bleed 578 into chamber 592. To control the slewing velocity of piston 576, it is only necessary to adjust needle valve 586. Thus, the gain of the integral reset piston and dashpot 552 can be varied by means of this adjustment.

As the speed error in a proportional governing system will likely be less than 5 percent, an integrator with a 5 percent speed authority reset capability would be sufficient to provide the desired speed regulation. For engine speeds less than the desired isochronous governing speed, the piston output is zero, and at that particular speed the position of the piston is somewhere intermediate the limits of its stroke, depending upon the amount of speed error correction needed to maintain that speed. At speeds greater than this speed, the piston is saturated. It should be noted that the length of the linkages 522 and 524 may be varied to alter the authority or reset capability of the integral reset piston and dashpot 552. During governing at speeds less than the set isochronous governing speed, the pilot valve 400 is positioned in a proportional manner; and for speeds greater than this speed, the valve is stroked as a proportional plus integral (isochronous) function of speed error.

The saturation in the integral path of the isochronous governor serves a two-fold purpose. The input saturation limits the maximum rate of integration by not allowing the reset piston to see a speed error signal input in excess of a predetermined percentage of engine speed, while the output saturation limits the authority of the integrator to reset fuel flow to an amount equivalent to a predetermined change in speed which is preferably just above the maximum steady-state droop error. Movement of shaft 530 thus causes a repositioning of surface 523 of link 522, with respect to main link 512. The output of shaft 530 is an integrated error signal. The governor linkage (502, 506, 512, 520, 522, and 524) then performs as follows:

A. acts as a highest wins device between acceleration and governor $W_f/P_{cd}$ pilot valve position;
B. compares the second set speed signal, integrated error signal and the actual speed signal and generates a corrective signal:
 1. positions the $W_f/P_{cd}$ pilot valve proportionately with the resulting speed error at speeds below the isochronous governing speed as set by isochronous speed adjustment screw 568;
 2. positions the $W_f/P_{cd}$ pilot valve as a proportional plus integral function of the resulting speed errors at speeds above the set isochronous governing speed.

The highest wins function of the governor linkage assembly can be best understood by reference to FIG. 1C. When the 3D cam rise (acceleration schedule) requests a smaller pilot valve opening than the governor, the maximum speed adjustment set screw 435 is contacted by surface 523 of link 522 in such a manner as to lift follower 434 off the acceleration contour of the cam 220 while simultaneously causing an increase in the pilot valve opening.

For purposes of describing the operation of the isochronous governor of the invention, assume that the isochronous speed adjustment screw is set for isochronous governing at 100 percent engine speed, and that the isochronous input adjustment screw 570 limits the maximum speed error input to the integral reset piston and dashpot 522 to 1 percent engine speed. Thus, for the conditions alluded to above, as 3D cam 220 moves upwardly, the opening of the pilot valve 400 is restricted and pressure $P_{R3}$, accordingly increases. If the throttle actuator 122 is set for 80 percent speed, as this speed is approached surface 523 contacts the face of screw 435 causing the opening of the pilot valve 400 to increase. Governing at this speed proceeds in a purely proportional manner along the governor droop line, the integral governor being ineffective due to the closure of port 564 by the lower land of spool 554. If a speed of 100 percent is then set on throttle actuator 122, speed set cam 500 will accordingly rotate so as to downwardly displace links 506 and 512 so as to allow proportional governing as the speed approaches 100 percent.

The operation of the reset piston can be described by a unit step function of stroke (integrated error signal) versus speed. For engine speeds less than 100 percent, the piston output is zero, as port 564 is blocked by the lower land of spool 554 of speed signal servo valve 550. At 100 percent, the position of the piston is between the limits of its stroke depending on the amount of speed error correction needed to maintain the engine speed within the desired accuracy. For purpose of illustration, assume that the speed increases to 102 percent, shaft 188 then moves upwardly so as to cause lever 566 to abut set screw 570, thus transmitting a speed error signal of 1 percent to the integral reset piston and dashpot 552. Pressurized servo fluid at a pressure $P_s$ then passes through the bleed 578 into chamber 592. Since chamber 592 is now vented to boost via line 562 and port 564, a pressure differential is occasioned across piston 576, which causes it to move upwardly and thereby effect a time integration of the speed error signal. Upward movement of the piston 576 causes surface 523 to displace set screw 435 in an upward direction, thus effecting a wider pilot valve opening and a lower pressure $P_{R3}$. As the speed decreases, shaft 188 moves downwardly, thus causing lever 566 to downwardly displace spool 554 until it reaches a steady-state position. It will be understood by those skilled in the art that the response time of the engine to changes in fuel flow within an operating regime is determinative of the rate of speed reset of the integral reset piston and dashpot 552 for stable operation.

The operation of the fuel control system of the invention will be described with reference to FIGS. 2 and 3. Referring to FIG. 2, where there is shown a functional block diagram of the control system of the invention, compressor inlet temperature $T_2$ and the speed sensed by the control N determine a point on interstage bleed valve schedule 600 which determines the desired interstage bleed valve angular position $\phi_R$. $\phi_R$ is then compared at 602 with the actual interstage bleed valve position $\phi_{IBV}$ to generate an error signal $\phi_E$, which is integrated with respect to time in bleed valve actuator 604.

Inputs N and $T_2$ also determine a point on acceleration schedule 606, which indicates the desired ratio of fuel flow to compressor discharge pressure, i.e., $W_f/P_{cd}$. An actual speed signal, representative of the speed sensed by the control N, and a first set speed signal, representative of the set isochronous speed $N_I$, are compared at 610 to generate an error signal which is transmitted to integral governor 612. Throttle lever setting T/L determines the second set speed signal which is compared with the actual speed signal to define a point on the proportional governor schedules 608, the resultant output signal of which is compared with the integrated error signal (as converted by the reset linkage assembly to a corrective signal, the maximum value of which is less than that of the proportional governor, but slightly above the maximum steady-state droop error thereof) at 614. The lowest value of the respective $W_f/P_{cd}$ outputs of the acceleration schedule 606 and the integral and proportional governor schedules 612 and 608 are compared at 616, which produces an output representative of the lowest value of $W_f/P_{cd}$. The lowest value of $W_f/P_{cd}$ produced by the integral governor 612 and the proportional governor schedules 608 and the acceleration schedule 606 is directed to highest wins 618, which also has as an input a minimum value of $W_f/P_{cd}$. The higher of the $W_f/P_{cd}$ inputs to 618 is directed to multiplier 620. Compressor discharge pressure $P_{cd}$ is also directed to multiplier 620. The output of multiplier 620 is the fuel flow to the engine $W_f$. Shut-off valve 622 receives the output of the multiplier and the throttle lever position T/L to either prevent or permit fuel flow $W_f$. Start solenoid 623 determines the primer flow $W_f$ to the engine.

The instrumentation which senses the aforementioned input parameters and manipulates them to compute the proper engine fuel flow at each operating condition is shown in block diagram form in FIG. 3, where the 3D cam provides the proper acceleration fuel flow and the IBV schedules and the governor linkage provides the proportional governor droop schedules.

The operation of the instant fuel control system, schematically illustrated in FIGS. 1a, 1b, and 1c, will be described with reference to the schematic diagram and FIG. 3, which is a conceptual instrumentation block diagram. During the start operation it is desired to supply fuel to the engine after a predetermined initial speed has been attained. Therefore, the engine is first accelerated to that speed by an auxiliary power unit in a manner well known to those skilled in the art. After attainment of this speed, switch 118 is closed, thus allowing fuel from wash filter 18 to flow through solenoid 110 to the engine. The igniter flow entering the engine is ignited by an igniter plug or other equivalent device. The throttle lever setting is then increased by "beeping" actuator 122 out of cut-off manually. A maximum of eight seconds after the throttle lever has been moved out of the cut-off position, microswitch 114 closes opening the windmill bypass valve 112, thus increasing fuel flow to the engine. The igniter/windmill bypass circuit is then de-energized by opening switch 118 which causes both the igniter valve and the windmill bypass valve to close, this de-energization occurring at a sufficient speed. The engine then accelerates automatically to idle from this speed by virtue of the acceleration schedule on 3D cam 220.

Assuming that the engine is at idle speed, the desired speed may be set by the throttle lever through actuator 122. Of course, it will be understood that this speed could be set initially in the actuator. Fuel is supplied to the centrifugal impeller pump at a pressure $P_i$ and delivered at the pump interstage 20 at a pressure $P_B$. Fuel from the pump then passes through a wash filter 18 and emerges at right angles thereto at a pressure $P_s$. Fuel flowing axially through the wash flow filter emerges at a pressure $P_f$ and is thence delivered to the main metering valve 26 where it emerges as a metered flow at pressure $P_m$. Fuel then flows from the metering valve 26 to the shut-off and pressurizing valve 30, emerging therefrom at a pressure $P_n$. Fuel at pressure $P_n$ is then communicated from outlet 132 to the main engine nozzle. Metering regulator 23 maintains a constant pressure differential between segments 22 and 28 of main fuel supply line 20 so that fuel flow is a function of metering valve position.

In a manner heretofore described, actuator 122 controls the position of shut-off and windmill bypass servo valve 36 by means of cam 134 on shaft 124. The shut-off and windmill bypass servo valve sends a bypass signal to the metering head regulator 23 which enables the metering head regulator to bypass the fuel in segment 22 to the fuel pump interstage 20. Upward displacement of the spool 136 of shut-off and windmill bypass servo valve 36 enables port 144 to communicate with boost pressure and thereby vent the fuel in line 64 to boost, which will cause the spool 42 of metering head regulator 23 to shift to the left and permit the bypass of fuel. As port 144 is exposed to boost pressure, port 148 of shut-off and windmill bypass servo valve 36 is simultaneously uncovered, thus communicating pressurized servo fluid through line 32 to the back of shut-off and pressurizing valve 30 to attain closure thereof. To generate a bypass signal and shut-off signal from shut-off and windmill bypass servo valve 36, it is only necessary to rotate shaft 124 by means of an appropriate command to actuator 122.

Compressor air inlet sensor 226 receives compressor inlet air at a temperature $T_2$, the temperature of the air being determinative of the stroke, $X_{T2}$, of arm 222. The displacement of arm 222 is transmitted to 3-D cam 220 through its pivoted connection therewith 224.

The hydromechanical speed computer 160 senses the engine speed N as supplied by the angular velocity of shaft 162. Rotation of shaft 162 causes shaft 188 to be displaced a distance $X_N$ in a manner heretofore described. This displacement $X_N$ is transmitted to the 3D cam 220 by virtue of its being mounted upon the shaft 188.

The interstage bleed valve schedule on the left face of cam 220 determines the position of follower 302, which in turn determines the set position $X^*_{IBV}$ of servo valve 311. This set position of the interstage bleed valve servo valve is then compared with the actual position of the IBV actuator piston 328 by means of a feedback linkage which includes shaft 330, cam 332, and links 304 and 334. The feedback linkage generates a position signal $X_{IBV}$ to servo valve 311. The linkage then compares $X^*_{IBV}$ and $X_{IBV}$ to position the servo valve 311 so as to allow the servo supply pressure to communicate with hydraulic actuator 387. Actuation of the actuator 387 results in a compressor interstage bleed valve angular position $\phi_{IBV}$.

The acceleration schedule on the right portion of 3D cam 220 commands a pilot valve opening $X_A$. The speed computer $X_N$ (actual speed signal) is compared with the first set isochronous speed signal $X_{Ni}$, as set by screw 568 or the heretofore mentioned equivalent linkage to generate an error signal to the integrating piston 552. If $X_N$ is less than $X_{Ni}$, the error signal is negative, that is, port 564 of speed signal servo valve 550 is blocked. When $X_N$ equals $X_{Ni}$, spool 554 moves to a position such that port 564 is partially open so as to maintain a steady-state force balance across piston 576 of integral reset piston and dashpot 552. Fluid in chamber 592 is then able to communicate with boost pressure through the partially blocked port 564. In this condition piston 576 occupies a position somewhere within the limits of its stroke. The error signal, in this condition, may be said to be zero. Variations in N about the set isochronous speed produce corresponding variations in actual speed signal $X_N$ depending on the sense of the variation of $X_N$ from $X_{Ni}$. Spool 554 is accordingly positioned so as to either increase the opening of port 564 at which a force balance is achieved, or cause a decrease in that opening, thus respectively effecting an upward or downward movement of shaft 530 to a new steady-state position. The position R of shaft 530 is then an integrated error signal. As the movement of shaft 530 results in a displacement of surface 523 and screw 435 in an up or down direction, the pilot valve 400 accordingly assumes a more open or closed position, thus causing a change in $W_F$ to the engine and thereby a change in engine speed which drives $X_N$ toward $X_{Ni}$. Therefore, the error signal to the integrating piston is continuously reduced (negative feedback) until spool 554 is at such a position that a force balance is acieved across piston 576. In response to an error signal from the speed signal servo valve 550, the integrating piston strokes to a position R (integrated error signal).

The speed setting cam 500 produces a second set speed signal X* which is transmitted to a linkage comprising links 502 and 506 which occasions a displacement of main link 512, thus determining the speed computer stroke at governor cut-in $X^*_n$. R, $X_N$, and X* are compared by links 502, 506, 512, 522, and 524 which generate a corrective governor linkage output signal $X_G$. The pilot valve assembly 402 acts as a highest wins linkage for submitted inputs $X_A$ and $X_G$.

Referring now to the pilot valve assembly 402 in FIG. 1C, it is evident that in the position shown $X_A$ is greater than $X_G$, that is, the acceleration schedule is commanding the higher pilot valve opening. However, if cam 220 where to assume a position such that surface 523 abuts screw 435 in such a manner as to cause follower 434 to be separated from the acceleration schedule on the cam 220, then $X_G$ would be greater than $X_A$.

Link 432 acts as a lowest wins linkage which has for an input either $X_A$ or $X_G$, depending upon which is greater, and $X_{max.}$, the maximum pilot valve opening as determined by the $W_f/P_{cd}$ minimum stop 430. In other words, the governor cannot open the pilot valve beyond the set opening dictated by the setting of screw 430. The lowest wins linkage output is the pilot valve opening $X_{(W_f/P_{cd})}$.

Compressor discharge pressure $P_{cd}$ is converted to a hydraulic pressure $P_{R3}$ in the $P_{cd}$ transducer 450. $X_{(W_f/P_{cd})}$ and $P_{R3}$ are transmitted to a hydraulic multiplier which is comprised of pilot valve 400 and fixed bleed 482. The output of the hydraulic multiplier is a pressure $P_{R3}$, which controls the position of the main metering valve servo actuator 83. The main metering valve servo actuator also receives pressurized servo fluid $P_s$. Changes in the pressure $P_{R3}$, determine the stroke $X_{MV}$ of the main metering valve 26, in a manner heretofore explained.

Therefore, if the isochronous speed adjustment screw is adjusted for isochronous governing in 100 percent, the governing of the engine speed, as set by speed set cam 500, is accomplished solely by the proportional governor up to 100 percent. Prior to attainment of this speed, the piston 576 of the integral governor 532 is urged to its lower limit of travel by the pressure in chamber 592, as port 564 of the speed signal servo valve 550 is blocked by spool 554. In this mode of operation, as the speed set by cam 500 is approached, surface 523 contacts screw 435 and regulates the pilot valve opening and hence the engine speed in a purely proportional manner. However, if the isochronous speed adjustment screw 568 is replaced by the linkage shown in FIG. 4, governing proceeds in a proportional and integral mode for all speeds set by cam 500.

During operation in the combined proportional and integral modes the authority of the integrator is limited with respect to its capability to reset the proportional governor (for example, a 5 percent engine speed reset capability) by links 522 and 524. Transient speed changes up to the set isochronous speed are controlled by only the proportional mode. This feature enhances the governor's response time to transients and hence results in superior speed control.

While I have shown and described specific forms of my invention, it is to be understood that various changes and modifications may be made without departing from the scope or spirit of the invention.

It will be noted that while the governor of the invention has been disclosed in hydromechanical form, the various components thereof may readily be replaced by electrical or fluidic equivalents. For example: the speed signal servo valve 550 could be replaced by a summing circuit; the integrating piston could be replaced by an integrating circuit; and the linkage 512, 522, 524 could be replaced by a summing circuit. It will also be appreciated by those skilled in the art that the governor of the invention may be practiced by digital techniques.

I claim:

1. In a fuel control for an engine, the combination comprising:
    metering means to meter fuel to the engine;
    first speed setting means to set a desired isochronous operating speed and generate a first set speed signal;
    second speed setting means to set a desired operating speed and generate a second set speed signal, said desired operating speed being in a range from less than said isochronous speed to at least equal to said isochronous speed;
    speed computer means to sense the actual speed of the engine and generate an actual speed signal;
    proportional governor means to compare the second set speed signal with the actual speed signal and generate a first corrective signal in response to deviations between said second set speed signal and said actual speed signal;
    metering control means normally responsive to said first corrective signal to control said metering means to regulate fuel flow to the engine in response to said first corrective signal at actual engine speeds below said desired isochronous speed;
    limited authority integrating governor means to compare said actual engine speed signal for a limited range of actual engine speed with said first speed set signal and generate an integrated second corrective signal in response to deviations between said desired isochronous speed and said actual speed within the range of limited authority of said integrating governor means, said integrating governor means including means to limit the maximum level of said second corrective signal to less than the maximum level of said first corrective signal whereby the speed changing authority of said integrating governor is limited to a range slightly greater than the maximum steady state droop error of said proportional governor; and
    means responsive to said second corrective signal to modify said metering control means whereby fuel flow to the engine is regulated in response to said first and second corrective signals when said first and second corrective signals are generated.

2. The combination of claim 1, wherein the first speed setting means comprises:
    means to set a desired isochronous operating speed different from the speed set by the second speed setting means.

3. The combination of claim 1, wherein the speed computer means comprises:
    a movable shaft; and wherein the proportional governor and the error signal generating means are operatively connected to the shaft for sensing the movement thereof.

* * * * *